(12) United States Patent
Olofsson

(10) Patent No.: US 11,768,039 B2
(45) Date of Patent: Sep. 26, 2023

(54) RECOVERY SYSTEM AND METHOD FOR RECOVERY OF THERMAL ENERGY FROM WASTE WATER

(71) Applicant: ECOCLIME SOLUTIONS AB, Vilhelmina (SE)

(72) Inventor: Lennart Olofsson, Umea (SE)

(73) Assignee: ECOCLIME SOLUTIONS AB

( * ) Notice: Subject to any disclaimer, the term of this patent is extended or adjusted under 35 U.S.C. 154(b) by 0 days.

(21) Appl. No.: 16/342,292

(22) PCT Filed: Oct. 25, 2017

(86) PCT No.: PCT/SE2017/051052
§ 371 (c)(1),
(2) Date: Apr. 16, 2019

(87) PCT Pub. No.: WO2018/080386
PCT Pub. Date: May 3, 2018

(65) Prior Publication Data
US 2020/0056846 A1    Feb. 20, 2020

(30) Foreign Application Priority Data
Oct. 25, 2016   (SE) .................................. 1651395-4

(51) Int. Cl.
*F28D 21/00*    (2006.01)
*E03C 1/122*    (2006.01)
(Continued)

(52) U.S. Cl.
CPC .......... *F28D 21/0012* (2013.01); *E03C 1/122* (2013.01); *F24D 11/02* (2013.01);
(Continued)

(58) Field of Classification Search
CPC .... F28D 21/0012; F28D 1/0213; E03C 1/122; E03C 2001/005; F24D 11/02;
(Continued)

(56) References Cited

U.S. PATENT DOCUMENTS 2,075,784 A    3/1937 Strand
2,467,021 A *  4/1949 Fischer ............... B02C 18/0092
                                                    210/197
(Continued)

FOREIGN PATENT DOCUMENTS

CA    2577224    7/2008
DE    2845677    4/1980
(Continued)

OTHER PUBLICATIONS

Patent Cooperation Treaty (PCT), International Search Report and Written Opinion for Application PCT/SE2017/051052 filed Oct. 25, 2017 dated Jan. 15, 2018, International Searching Authority, SE.

*Primary Examiner* — Travis Ruby
(74) *Attorney, Agent, or Firm* — McDonald Hopkins LLC

(57) ABSTRACT

Recovery system for the recovery of thermal energy from waste water from building, which system comprises a heat pump adapted to absorb thermal energy from a non-freeze liquid circulating through the heat pump and arranged to deliver thermal energy to water flowing through the heat pump, a heat exchanger device that is in contact with said waste water, and a pipeline system disposed between the heat pump and the heat exchanger device, and in which non-freeze liquid can circulate. The heat exchanger device is designed so that the non-freeze liquid passes through the heat exchanger device, whereby the non-freeze liquid is able to absorb thermal energy from the waste water. Further, the system comprises a collector tank, and a pipeline system for supplying waste water to the collector tank. The heat
(Continued)

Figure 1:
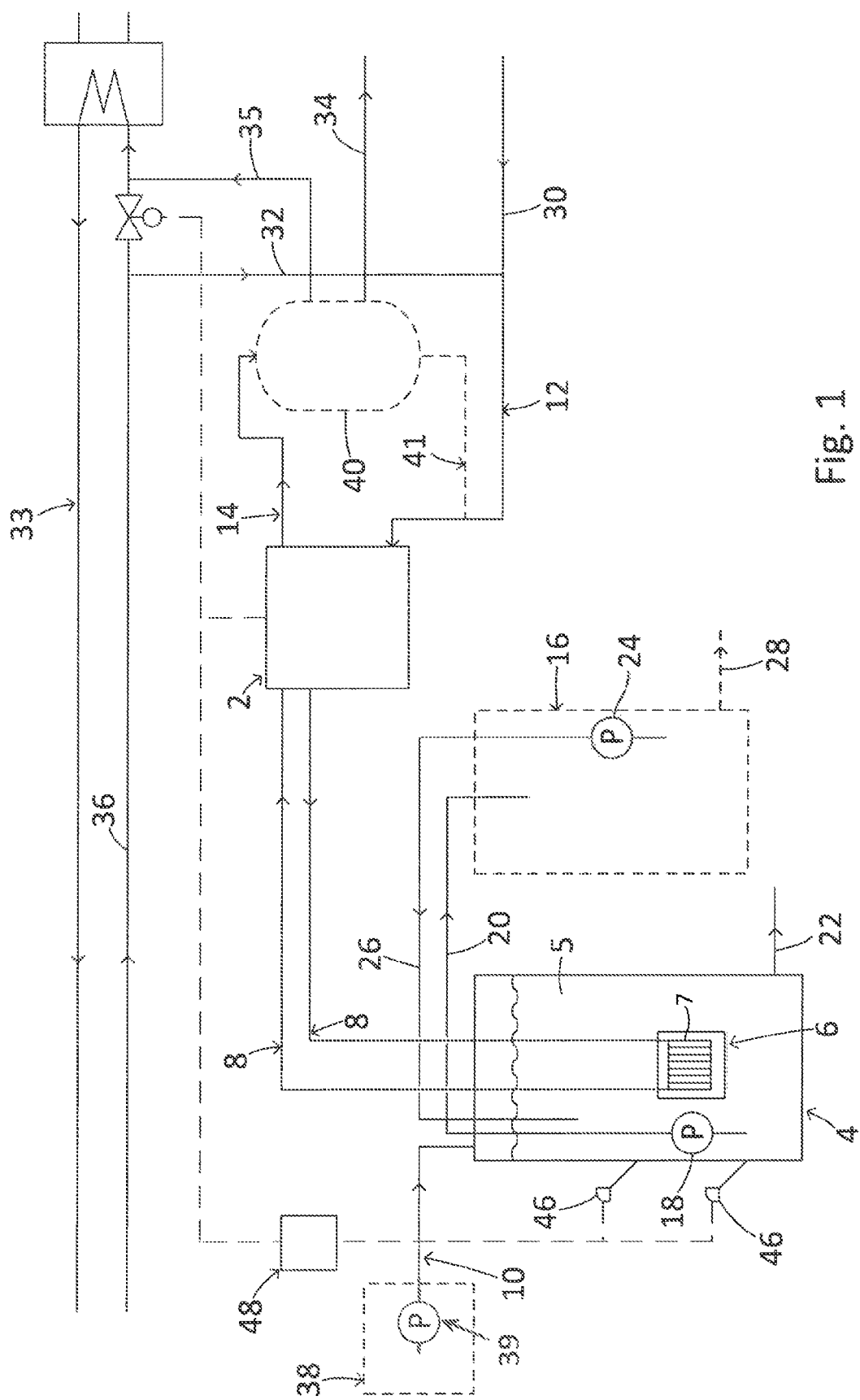

exchanger device is disposed in the collector tank, wherein the non-freeze liquid can absorb thermal energy from waste water in the collector tank.

3 Claims, 4 Drawing Sheets

(51) Int. Cl.
  *F24D 11/02* (2006.01)
  *F24D 17/00* (2022.01)
  *F24D 17/02* (2006.01)
  *F28D 1/02* (2006.01)
  *F28F 3/12* (2006.01)
  *F28F 3/14* (2006.01)
  *E03C 1/00* (2006.01)

(52) U.S. Cl.
  CPC ....... *F24D 17/001* (2013.01); *F24D 17/0005* (2013.01); *F24D 17/02* (2013.01); *F28D 1/0213* (2013.01); *F28F 3/12* (2013.01); *F28F 3/14* (2013.01); *E03C 2001/005* (2013.01); *F24D 2200/20* (2013.01); *F24D 2220/08* (2013.01)

(58) Field of Classification Search
  CPC .... F24D 17/0005; F24D 17/001; F24D 17/02; F24D 2200/20; F24D 2220/08; F28F 3/12; F28F 3/14
  See application file for complete search history.

(56) References Cited

U.S. PATENT DOCUMENTS

| | | | | |
|---|---|---|---|---|
| 4,071,445 A * | 1/1978 | Katayama | ............ | B01D 61/025 |
| | | | | 210/151 |
| 4,352,391 A * | 10/1982 | Jonsson | .............. | F28D 21/0012 |
| | | | | 165/47 |
| 2008/0267845 A1 * | 10/2008 | Hoglund | .................. | F28F 3/083 |
| | | | | 422/224 |
| 2011/0203303 A1 * | 8/2011 | Moure | ...................... | F28F 9/22 |
| | | | | 62/324.1 |
| 2011/0220340 A1 * | 9/2011 | Eriksson | ............... | F28F 9/0258 |
| | | | | 165/185 |
| 2012/0159980 A1 | 6/2012 | Moure | | |
| 2012/0216837 A1 * | 8/2012 | Kovarik | ................. | C02F 1/001 |
| | | | | 134/21 |
| 2013/0146226 A1 * | 6/2013 | Ramm-Schmidt | ........................ | |
| | | | | B29C 66/83415 |
| | | | | 156/499 |
| 2013/0228309 A1 * | 9/2013 | Wood | ...................... | F24D 17/02 |
| | | | | 165/104.22 |
| 2014/0090811 A1 * | 4/2014 | Schmid | ................... | F28F 13/06 |
| | | | | 165/104.19 |
| 2015/0114019 A1 * | 4/2015 | Van Gysel | ............ | F24D 17/001 |
| | | | | 62/238.7 |
| 2016/0194997 A1 * | 7/2016 | McAlister | ............... | F24T 10/30 |
| | | | | 60/273 |
| 2016/0231071 A1 * | 8/2016 | Sekol | ...................... | F28F 23/00 |
| 2016/0271342 A1 * | 9/2016 | Bronkhorst | ............... | F28F 3/12 |
| 2016/0312319 A1 * | 10/2016 | Kusuda | ................... | B09B 3/00 |
| 2016/0363123 A1 * | 12/2016 | Davis | ................. | F04D 29/2288 |

FOREIGN PATENT DOCUMENTS

| | | | | |
|---|---|---|---|---|
| DE | 2919004 | | 11/1980 | |
| FR | 2982357 | | 5/2013 | |
| GB | 2247072 | | 2/1992 | |
| JP | 11090465 A | * | 4/1999 | ............... C02F 3/00 |
| SE | 0802068 A1 | | 3/2010 | |
| WO | 2007126261 | | 11/2007 | |

\* cited by examiner

RECOVERY SYSTEM AND METHOD FOR RECOVERY OF THERMAL ENERGY FROM WASTE WATER

CROSS-REFERENCE TO RELATED APPLICATION

This application is a 35 U.S.C. § 371 national stage application of PCT Application No. PCT/SE2017/051052 filed on Oct. 25, 2017, entitled "RECOVERY SYSTEM AND METHOD FOR RECOVERY OF THERMAL ENERGY FROM WASTE WATER," which claims priority to Swedish Patent Application No. 1651395-4 filed on Oct. 25, 2016, each of which are incorporated herein in their entirety by reference.

TECHNICAL FIELD OF THE INVENTION

The invention relates to a recovery system for the recovery of thermal energy from waste water from buildings. The recovered thermal energy can be used for, for example, thermal energy supply to a heating system based on waterborne heat, air, or for heating tap water. Such a recovery system comprises a heat pump with a piping arrangement by means of which water can circulate through the heat pump, a heat exchanger device in contact with the waste water, and a pipeline system for circulating a non-freeze liquid between the collector tank and the heat pump. The heat exchanger device is arranged so that the non-freeze liquid can absorb thermal energy from the waste water when the non-freeze liquid passes through the heat exchanger. The heat pump is adapted to recover thermal energy from the non-freeze liquid circulating through the heat pump and to transfer thermal energy to the water circulating through the heat pump.

BACKGROUND

A building waste water system includes the piping system through which all waste water from the building is collected in order to subsequently be drained off into one or more sewage systems outside the building to which the waste water system is connected. This sewage system may, for example, be a municipal sewage system or the building may have its own sewage disposal system. The waste water contains water from drainage in dishwashers, washing machines, showers and baths, in other words so called grey water, and also water from toilet drainage (water closets), so called black water. The waste water from building often contains relatively much heat when flushed into the sewage system. This applies in particular to the grey water from dishwashers, washing machines, manual dish washing and laundry, washbasins, showers and baths where either cold water is heated in the respective machine or hot tap water is used. This grey water is then mixed with the black water from the toilets, where cold flushing water is used, but also the resulting mixed waste water often contains a lot of heat. In Sweden, the measured average temperature of waste water that leaves buildings through the sewage systems is 26° C.

A relatively large proportion of the total thermal energy consumption in a building is energy for heating water in dishwashers, washing machines and tap hot water. According to the Swedish Energy Agency, this figure accounts for 20-30% of the total energy consumption in older buildings and 40-60% in the buildings built today according to the Boverket building regulations. Thus, there are good savings to make if at least part of this energy could be recovered and thus result in a reduction of the total energy consumption.

It is previously known different recovery systems for utilizing the thermal energy present in waste water in the form of grey water. Many such systems use a heat pump. For example, from GB 2247072 is previously known a system for heating, cooling and ventilation in a building where a heat pump is used. An antifreeze solution circulates in a closed pipe system that passes through a heat exchanger where the antifreeze solution is heated by warm domestic waste water and then passes through a vaporizer in the heat pump. This heat exchanger is indicated to be of the counterflow type. In the evaporator, the heat is transferred from the heated antifreeze solution to a refrigerant circulating inside the heat pump, which causes the refrigerant to heat up a few degrees and evaporate. Via a condenser, the heat is transferred from the refrigerant to the return water in a waterborne heating pipeline system which has a loop passing through the heat pump. By waterborne heating pipeline system is meant a water pipeline system for waterborne heating which is used for heating the building. The thus heated water is then collected in a hot water tank where it can be heated further so that it gets a sufficiently high temperature to be transferred to the domestic hot water system or the waterborne heating pipeline system. The heat exchanger used to transfer heat from the waste water to the antifreeze solution is described as being of the counterflow type, which would mean that antifreeze solution is conveyed to flow in one direction while the waste water is conveyed so that it flows in the opposite direction. According to FIG. 2, the heat exchanger appears to be a simple form of tube heat exchanger. A tube heat exchanger usually comprises two piping systems, one system for the antifreeze solution and one system through which the waste water is conveyed. GB 2247072 also shows a tank for storing thermal energy, i.e. a form of accumulator tank. If the heat in the antifreeze solution is not recovered in the heat pump, e.g. if the pump is switched off, the antifreeze solution is conveyed to this tank, which also contains a heat exchanger. The heat in the antifreeze solution is then transferred via the heat exchanger to the water contained in the tank, and thermal energy can thus be stored in the tank.

A disadvantage of the recovery system described in GB 2247072 is that it can only be used for grey water. It would be desirable to also extract heat from waste water containing mixed grey water and black water. A general desire with heat exchangers is to get as high efficiency as possible.

From CA 2577224 it is previously known to recover heat from grey water by conveying the grey water through a heat exchanger or heat pump. The heat exchanger/heat pump is described as having a tank for grey water without further description. The system is used to heat domestic hot water. Also this system has the disadvantage that only grey water is used.

SUMMARY OF THE INVENTION

An object of the present invention is to obtain an improved heat recovery system for recovering thermal energy from waste water from buildings.

Another object is to make it possible to use the heat recovery system for waste water that also contains black water.

The invention is based, among other things, upon the realization that normal water consumption in buildings, especially residential properties, varies over the day. Typically, water consumption is cyclic in the sense that the variation over the day is largely the same regardless of weekday. Thus, usually the demand for hot water is greatest in the morning and in the evening and high energy waste water is also produced mainly in the morning and the evening. Generally, there is also a big difference between daytime and night time, because the flow of waste water is almost nil during night time. Further, a more efficient recovery of heat could be obtained if heat could also be recovered from waste water containing black water.

According to the present invention is defined a recovery system for the recovery of thermal energy from waste water from a building, which system comprises:
- a collector tank,
- a supply pipeline system for supplying waste water to the collector tank,
- a heat pump,
- a heat exchanger device arranged in the collector tank and which is in contact with said waste water,
- a heat transfer fluid pipeline system arranged between the heat pump and the heat exchanger device, characterized in that
- the heat pump is configured to absorb thermal energy from a non-freeze liquid circulating through the heat pump, which non-freeze liquid can be used as a heat transfer liquid, and the heat pump is configured to transfer thermal energy to water flowing through the heat pump,
- that non-freeze liquid can circulate in said pipeline system, wherein the heat exchanger device is configured such that non-freeze liquid is conveyed through the heat exchanger device, wherein the non-freeze liquid can absorb thermal energy from waste water in the collector tank, and that the recovery system comprises at least one cutting pump, wherein
  - a cutting pump is located in a buffer tank for waste water, which buffer tank is connected to the collector tank via a collector tank pipeline for conveying waste water from the buffer tank to the collector tank, said pump being configured to pump waste water from the buffer tank to the collector tank via the collector tank pipeline, and/or
  - a cutting pump is located in the in the collector tank for pumping waste water to a buffer tank for waste water, via a buffer tank pipeline for conveying waste water from the collector tank to the buffer tank, and/or
  - a cutting pump, located in a preparatory unit, wherein the cutting pump is configured to pump waste water to the collector tank or to a buffer tank.

The non-freeze liquid is a heat transfer fluid, and it refers to an anti-freeze solution, or a so called brine liquid, for example water mixed with spirits or glycol, and which is suitable for absorbing heat as it passes through the heat exchanger element in the collector tank and to transfer heat to the refrigerant circulating in a heat exchanger device which is a part of a vaporizer in the heat pump.

By providing a collector tank in which waste water is collected and providing the heat exchanger device in the collector tank, the advantage is obtained that it will be possible to have an arrangement with a heat exchanger device where the waste water in the collector tank can circulate freely in the tank. That is, no piping system is required for transporting the waste water as in a counterflow heat exchanger. This also makes it possible to include black water in the waste water as there is no risk that solid particles in the black water will clog and cause stoppage in the heat exchanger tubes. The collector tank also serves as a storage tank for waste water so that waste water can be stored during the time periods when the inflow of hot waste water is the highest, and as a result a greater part of the heat in the waste water can be recovered than otherwise possible, and it can be saved for the times during the day when the need for thermal energy is the greatest. Further, by using at least one pump in the waste water recovery system that is a cutting pump, any solid components will be shredded and cut up in such a pump, which also contributes to making it possible to include black water in the waste water recovery system. Consequently, a more efficient energy recovery can be obtained, from a varying, e.g. cyclically varying, waste water flow.

Thus the recovery system is primarily intended for waste water in the form of grey water and black water. The waste water thus comes primarily from residential buildings, commercial buildings or similar properties, where the waste water primarily is the result of human activities and not industrial activities.

According to one embodiment, the recovery system may also include a buffer tank for waste water, which communicates with the collector tank via a collector tank pipeline for the supply of waste water from the buffer tank to the collector tank. With a buffer tank connected to the collector tank is obtained a further improved opportunity to store waste water during the time periods when the availability of heated waste water is the greatest. The recovery of thermal energy from the waste water can then be done retroactively when need arises or it can be controlled in other ways. The buffer tank and the pipeline system for the supply of waste water can be arranged such that the waste water is first conveyed to the buffer tank before it is conveyed further to the collector tank via the collector tank pipeline. The supply pipeline system for supplying waste water to the collector tank then includes a supply pipeline for supplying waste water to the buffer tank and it also includes the collector tank pipeline for conveying waste water from the buffer tank to the collector tank. Alternatively, the supply pipeline system may be arranged such that the waste water is first conveyed to the collector tank. In the latter case, the pipeline system for supplying waste water to the collector tank comprises a supply pipeline for supplying waste water to the collector tank.

Both the collector tank and the buffer tank are preferably heat insulated tanks in order to maintain the heat in the waste water for as long as possible.

In one embodiment, the buffer tank may comprise a pump for pumping waste water from the buffer tank to the collector tank via the collector tank pipeline. This facilitates the transport of waste water between the tanks.

In one embodiment, the recovery system may include a buffer tank pipeline for conveying waste water from the collector tank to the buffer tank. This makes it possible to convey waste water from the collector tank to the buffer tank, for example when the level or volume of waste water in the collector tank becomes too high.

Emptying usually takes place when the temperature of the waste water in the collector tank has fallen below a certain level, which e.g. occurs when the maximum amount of thermal energy has been extracted from the waste water in the collector tank.

In another embodiment, the collector tank may comprise a pump for pumping waste water to the buffer tank via the buffer tank pipeline.

Said pumps may advantageously be of a cutting type in order to be able to finely disintegrate coarser particles derived from black water, thereby preventing stoppage in pumps or pipelines.

According to a further embodiment, the supply pipeline system for the supply of waste water to the collector tank may comprise a supply pipeline in which there is provided a valve after which the supply pipeline is divided into a first sub-pipeline in communication with the collector tank and a second sub-pipeline in communication with the buffer tank, the valve being configured to control that the waste water is supplied to the collector tank via the first sub-pipeline or via the second sub-pipeline, and from the second sub-pipeline via the buffer tank and the collector tank pipeline to the collector tank. With this embodiment, the advantage of an optional choice is obtained with respect to which of the two collector and buffer tanks to which the waste water is to be conveyed. When emptying the collector tank or when the collector tank is full, for example, the waste water can be conveyed to the buffer tank.

According to another embodiment, the heat exchanger device may comprise at least one heat exchanger element through which the non-freeze liquid circulates, wherein the heat exchanger element comprises at least two substantially parallel plates, wherein an inlet for non-freeze liquid is provided at the heat exchanger element and an outlet for non-freeze liquid is provided at the heat exchanger element and an internal flow passage for non-freeze liquid is defined between the two plates and said inlet and said outlet. By having a heat exchanger element of the indicated type with two plates between which an internal flow passage for non-freeze liquid is defined, the advantage is obtained that the surface available for contact and heat transfer between the waste water and the non-freeze liquid is relatively large. This is beneficial for being able to transfer a larger amount of thermal energy. Furthermore, by having heat exchanger elements in the form of plates that can be lowered into the waste water, it is especially suitable for use with waste water that also contains black water, because the waste water does not need to be conveyed through pipes or confined spaces but can be free in the tank.

Preferably the plates are made of a self-supporting polymeric material.

According to one embodiment, the heat exchanger device may comprise a plurality of interconnected heat exchanger elements which are connected in parallel with respect to the flow direction of the non-freeze liquid. The same supply pipeline with non-freeze liquid can thus be used so that the non-freeze liquid flows into the heat exchanger elements simultaneously and from a supply pipeline that is common to the heat exchanger elements. The same applies to the emptying of non-freeze liquid from the heat exchanger elements which occur simultaneously and by a common pipeline.

According to another embodiment, the heat exchanger device may comprise one or more sets of heat exchanger elements, each set comprising a plurality of heat exchanger elements through which non-freeze liquid circulates. The handling is simplified by the heat exchanger elements being arranged in joined sets.

According to a further embodiment, the recovery system may include an accumulator tank connected to the heat pump in which water that has absorbed thermal energy in the heat pump can be stored before being conveyed to a domestic hot water system or a water borne heating system. An advantage of using an accumulator tank is that it can help equalize the flows such that the heat pump can work evenly and does not need to be turned off or on as soon as the heat demand for hot water and/or the demand in the water borne heating system changes. Furthermore, in the event that the water temperature in the accumulator tank should drop below a certain level which requires it to be reheated, a return line for water from the accumulator tank to the heat pump can be provided.

In a further embodiment, the recovery system may include a water pipeline system for the water flowing through the heat pump and to which thermal energy is transferred, which water pipeline system comprises a water supply pipeline for supplying water to the heat pump from a domestic cold water pipeline and/or from a return pipeline in a water borne heating system for heating one or several buildings, and a water outlet pipeline that conveys water from the heat pump to a domestic hot water system and/or to a water borne heating system for heating one or more buildings.

According to another embodiment, the heat transfer fluid pipeline system arranged between the heat pump and the heat exchanger device and in which non-freeze liquid can circulate, comprises a heat exchanger unit, the pipeline system being divided into two parts in the form of a first part where non-freeze liquid circulates between said heat exchanger unit and the heat exchanger device located in the collector tank, and a second part where non-freeze liquid circulates between said heat exchanger unit and the heat pump, and wherein the heat exchanger unit is disposed between the first and second parts of the pipeline system. In this manner, an additional protective measure is obtained to prevent that contaminated non-freeze liquid from a defective heat exchanger element enters directly into the heat exchanger of the heat pump, which can then lose its function or break down.

In another embodiment, the recovery system may comprise at least one temperature sensor for measuring a temperature of the waste water in the collector tank, and a control system for controlling the heat pump based on measured temperature in the waste water in the collector tank. If the temperature in the waste water is lower than a predetermined value, for example, the heat pump can be switched off. The waste water in the collector tank can then be flushed out and new waste water can be supplied into the collector tank. It is also possible to control the heat pump in other ways.

According to another embodiment, the recovery system may include a control system for controlling the temperature and/or flow of waste water in the system, and/or non-freeze liquid in the system, and/or water in the system's heat pump, and/or the water in an optional accumulator tank connected to the heat pump, based on measuring one or more of said flows and/or measuring the temperature of the waste water in different parts of the recovery system, and/or measuring the temperature in the water flowing through the heat pump and/or the water in an optional accumulator tank connected to the heat pump, and/or measurement of the temperature of the non-freeze liquid in different parts of the recovery system. Such a control system then includes various sensors, controllers and other equipment that may be required for the control. It may also include processors, computer programs and the like. With the help of a control system, the recovery system can be optimized with respect to different parameters, e.g. over different parts of the day.

It is also conceivable to connect additional devices to the recovery system, for example in the form of devices that can heat the waste water in the collector tank or buffer tank. E.g. it would be possible to use solar collector units or condensate collector units to help increase the temperature of the waste water in the collector tank or buffer tank. Such solar collector units or condensate collector units may then be connected to additional heat exchanger devices arranged in the respective tank. These heat exchanger devices are preferably of the same type as used for the non-freeze liquid.

According to another aspect of the invention is defined a method for recovering thermal energy from waste water from a building, comprising:

conveying waste water into a collector tank in which there is a heat exchanger device which is in contact with said waste water, and in which heat exchanger device a non-freeze liquid circulates which can absorb thermal energy from the waste water, which non-freeze liquid also circulates through a heat pump where the non-freeze liquid can transfer thermal energy and where water flowing through the heat pump can absorb thermal energy, filling of waste water in the collector tank from a buffer tank where waste water can be stored wherein the conveying of the waste water includes conveying the waste water through at least one cutting pump, wherein said at least one cutting pump is located in the buffer tank, which buffer tank is connected to the collector tank via a collector tank pipeline for conveying waste water from the buffer tank to the collector tank, said pump being configured to pump waste water from the buffer tank to the collector tank via the collector tank pipeline, and/or said at least one cutting pump is located in the in the collector tank for pumping waste water to the buffer tank for waste water, via a buffer tank pipeline for conveying waste water from the collector tank to the buffer tank, and/or said at least one cutting pump, located in a preparatory unit, from which the cutting pump is configured to pump waste water to the collector tank or to the buffer tank.

According to an embodiment of the method, waste water can be conveyed to the buffer tank when the collector tank has reached a predetermined level or volume of waste water.

According to another embodiment of the method, waste water can be conveyed to the buffer tank during emptying of the collector tank. In this case, the waste water can then be conveyed directly to the buffer tank.

According to an embodiment of the method, the heat pump can be controlled based on measured temperature in the waste water in the collector tank.

According to another embodiment of the method, it may include control of the recovery system based on measurement of the temperature and/or flow of waste water in the system, and/or non-freeze liquid in the system, and/or water in the system's heat pump and/or the water in an optional accumulator tank connected to heat pump, and that said control is based on measurement of one or more of said flows and/or measuring of the temperature of the waste water in different parts of the recovery system, and/or measuring of the temperature in the water flowing through the heat pump and/or the water in an optional accumulator tank connected to the heat pump, and/or measuring the temperature of the non-freeze liquid in different parts of the recovery system.

According to a further embodiment of the method, the water flowing through the heat pump and the transferred thermal energy may be used for tap hot water and/or in a building heating system.

The stated method has advantages corresponding to the advantages described above in connection with the recovery system.

In summary, a flexible and efficient heat recovery system is obtained that can be adapted to different access to waste water, different needs of heated water and which can also take care of black water. The recovery system can be installed indoors or outdoors, above ground or underground.

Further embodiments and advantages will be apparent from the following detailed description.

SHORT DESCRIPTION OF THE FIGURES

Figure 2C:
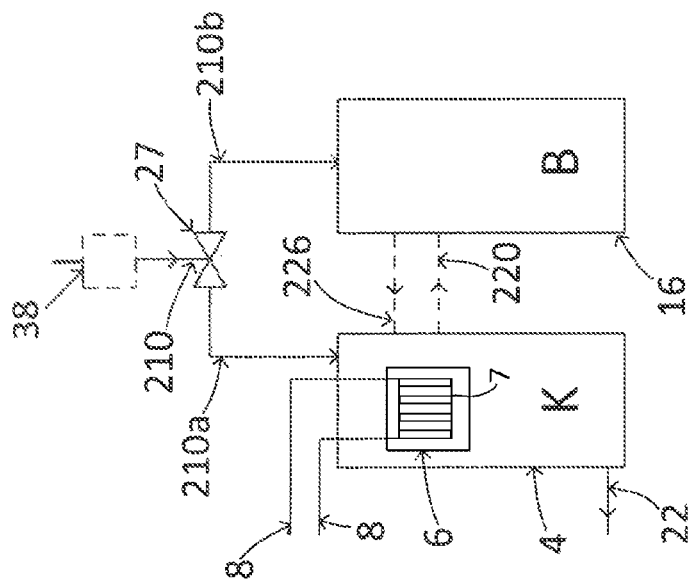
Figure 2B:
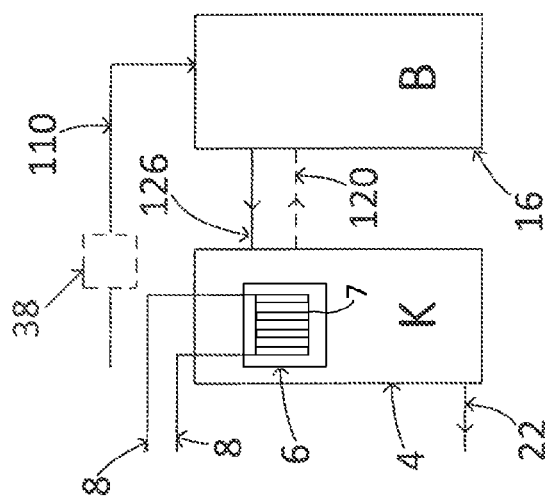
Figure 2A:
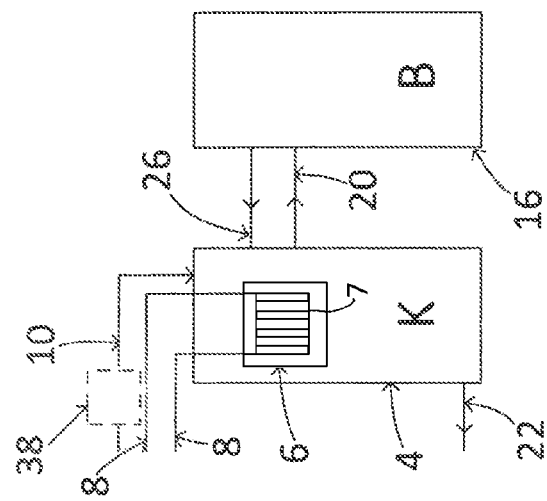
Figure 3:
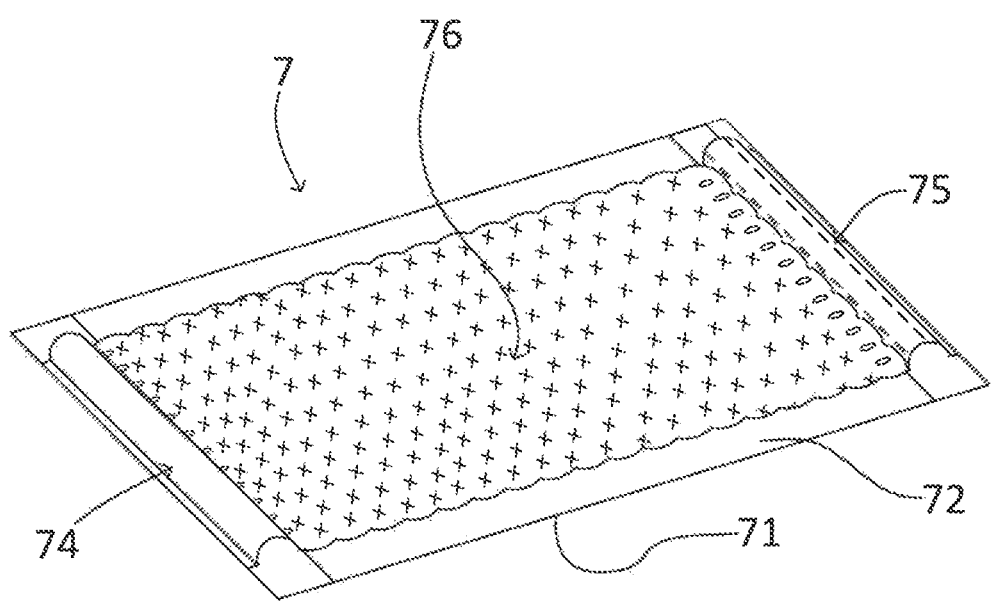
Figure 4:
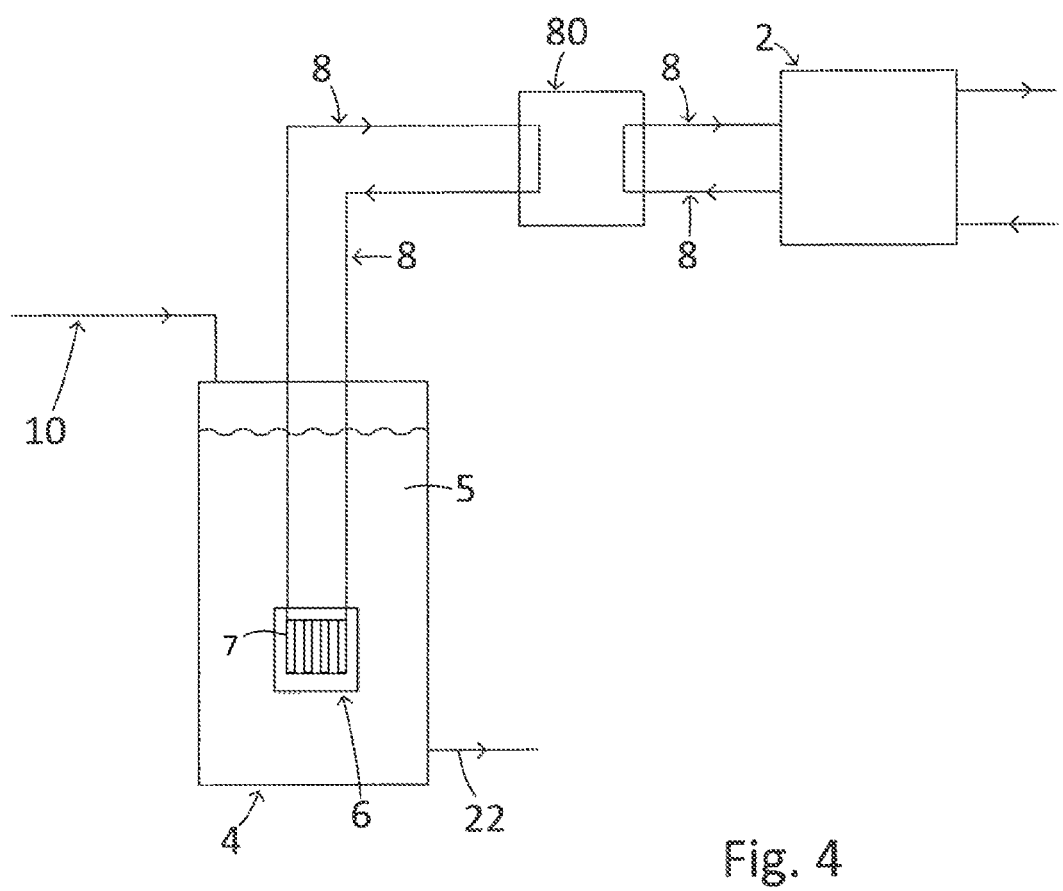

The invention will now be described in greater detail, with reference being made to the accompanying schematic figures, which illustrate various aspects and embodiments of the invention, which are intended for exemplary purposes only, and in which:

FIG. 1 illustrates schematically the recovery system and the various components, FIGS. 2*a*-2*c* schematically illustrate different embodiments of certain parts of the recovery system, FIG. 3 shows schematically an exemplary embodiment of a heat exchanger element, and FIG. 4 shows schematically an alternative embodiment of a part of the recovery system according to the invention.

Elements that are the same or relate to corresponding or equivalent elements have been given the same reference numerals in the various figures.

DETAILED DESCRIPTION OF THE INVENTION

In FIG. 1, an embodiment of a recovery system for recovering thermal energy from waste water from buildings is illustrated. The waste water may contain both grey and black water. The system comprises a heat pump 2, a collector tank 4, a heat exchanger device 6 located in the collector tank 4, and a heat transfer fluid pipeline system 8 for circulating a non-freeze liquid between the heat pump 2 and the heat exchanger device 6.

The heat pump 2 can be of standard type and operates in a conventional manner with an evaporator side and a condenser side. The heat pump 2 is configured to absorb thermal energy from the non-freeze liquid circulating through the heat pump on the evaporator side and arranged to deliver thermal energy to water flowing through the heat pump on the condenser side.

The recovery system further comprises a supply pipeline system for supplying waste water 5 to the collector tank, comprising a supply pipeline 10. This waste water comes from one or more buildings adjacent to which the recovery system is installed and the waste water may contain both grey and black water. The waste water 5 is collected in the collector tank 4. The waste water usually contains a certain amount of thermal energy which can be transferred to the non-freeze liquid via the heat exchanger 6 located in the collector tank as it passes through the heat exchanger device. For this purpose, the heat exchanger device 6 comprises at least one heat exchanger element 7 through which circulates the non-freeze liquid, whereby the non-freeze liquid can absorb thermal energy from the waste water in the collector tank.

In one embodiment, the heat transfer fluid pipeline system 8 is designed as a closed pipe loop passing through the heat exchanger device 6 in the collector tank 4, and further out from the collector tank and then into the heat pump 2 and through the heat pump evaporator. Then it exits from the heat pump 2 and goes back into the collector tank 4.

The heat pump 2 also includes a pipeline arrangement on the condenser side of the heat pump through which water can flow through the heat pump to thereby heat up. The pipeline arrangement in the heat pump is coupled to a inlet pipeline 12 for supplying relatively low temperature water and an outlet pipeline 14 for higher temperature water, as the supplied water has been heated inside the heat pump.

The heat pump 2 is thus configured to absorb thermal energy from the non-freeze liquid circulating through the heat pump on the evaporator side and to deliver thermal energy to the water flowing through the heat pump on the condenser side.

In one embodiment, the recovery system may include a buffer tank 16 for waste water. In this buffer tank 16, waste water can be stored. The buffer tank 16 may be arranged in at least three different ways relative to the collector tank as illustrated schematically in FIGS. 2a, 2b and 2c.

According to a first embodiment A in FIG. 2a, which corresponds to that shown in FIG. 1, the waste water is conveyed through the supply pipeline 10 directly into the collector tank 4 (K) where the waste water is collected. Waste water can then, when the need arises, for example when the level or volume in the collector tank 4 becomes too high, be conveyed to the buffer tank 16 (B) via a buffer tank pipeline 20. The waste water in the buffer tank can then be returned to the collector tank via a collector tank pipeline 26, when required. Possibly the same pipeline can be used as both buffer tank pipeline and collector tank pipeline, i.e. the waste water can be conveyed in both directions in one and the same pipeline. Preferably, there are also pumps installed in the form of a collector tank pump 18 and a buffer tank pump 24 for pumping the waste water from one tank to the other.

According to a second embodiment B, which is schematically illustrated in FIG. 2b, the waste water is conveyed through the supply line 110 directly into the buffer tank 16 (B) where the waste water is collected. The waste water can then be conveyed from the buffer tank 16 to the collector tank 4 (K) via the collector tank pipeline 126, when needed. Here too, there may be a pump in the buffer tank to pump the waste water to the collector tank.

According to the third embodiment C illustrated in FIG. 2c, there is a valve 27 in the waste water supply pipeline 210 and with this valve it is possible to control whether the waste water is to be conveyed directly to the collector tank 4 (K) or to the buffer tank 16 (B). For this purpose, the supply pipeline is divided after the valve in a first sub-pipeline 210a connected to the collector tank 4 and a second sub-pipeline 210b connected to the buffer tank 16. For example, if there is a need for filling in the collector tank 4, the waste water is directed directly to the collector tank. If, for example, the collector tank 4 is already full, the waste water can be conveyed to the buffer tank 16, which is then filled up. The waste water can then be conveyed from the buffer tank to the collector tank via the collector tank pipeline 26, when need arises for refilling in the collector tank. When emptying the collector tank, waste water can also be conveyed directly to the buffer tank for later transfer to the collector tank. Also in this embodiment there may be a pump in the buffer tank to pump the waste water to the collector tank.

In FIG. 2b and FIG. 2c, there is also illustrated an optional buffer tank pipeline 120, 220 for conveying waste water from the collector tank to the buffer tank. For example, it may be used if you want to transfer waste water from the collector tank to the buffer tank before the collector tank is to be emptied. Emptying of waste water from the collector tank into the sewage system can be done via the drain pipe 22 of the collector tank. The optional buffer tank pipeline can also be used if the level or volume of waste water in the collector tank becomes too high, so that waste water needs to be conveyed to the buffer tank. Possibly, even the same pipeline can be used both as buffer tank pipeline and collector tank pipeline, i.e. the waste water can be conveyed in both directions in one and the same pipeline. Preferably, one or more pumps are also installed to pump the waste water from one tank to the other.

Since the waste water may also contain black water with coarser relatively solid components, at least one of said pumps is preferably of cutting pump in order to shred and decompose these coarser components and prevent clogging and stoppage in the pumps or elsewhere in the system.

In general, for all embodiments, the collector tank may have a pump for pumping waste water to the buffer tank and the buffer tank may be provided with a pump for pumping waste water to the collector tank. At least one of said pumps is preferably a cutting pump, as mentioned above.

Further details will now be described with reference primarily to FIG. 1 illustrating embodiment A, the principle of which is shown in FIG. 2a. However, it should be noted that the details described are also applicable to the other embodiments. As mentioned, for example, when the level of waste water 5 in the collector tank 4 becomes too high, then waste water can be pumped from the collector tank to the buffer tank 16 by means of a pump 18 and via a buffer tank pipeline 20. This can preferably be controlled automatically, e.g. via a level sensor in the collector tank. As is also mentioned, the collector tank 4 is also provided with a drain pipe 22 for emptying the collector tank. This usually occurs when the maximum amount of thermal energy has been extracted from the existing waste water in the collector tank. Also when emptying from the collector tank, it is possible to pump waste water 5 from the collector tank 4 to the buffer tank 16, if desired.

In order to be able to pump back waste water from the buffer tank 16 to the collector tank 4, a pump 24 is provided in the buffer tank 16, and this pump 24 can pump waste water back to the collector tank via the collector tank pipeline 26, if desired. Also, the buffer tank is preferably provided with a drain pipe 28.

As mentioned, the heat pump 2 has an inlet pipeline 12 for supplying relatively low temperature water and an outlet pipeline 14 for higher temperature water because the water supplied has been heated inside the heat pump. The water supplied to the heat pump 2 for heating may be cold water from a tap water pipeline 30 in a drinking water pipeline system and/or return water from a return water pipeline 32 in a water borne heating system 33 for heating the actual building or possibly another building or multiple buildings. The heated water dispensed from the heat pump 2 may be supplied to a tap hot water system 34 and/or a water borne heating system 33 for heating the building or any other building/buildings. In the latter case it can be returned. for example, via a return pipeline 35 to the building's return water borne heating pipeline system 36 where it is then conveyed through a heat exchanger for transferring thermal energy to the heating part of the water borne heating system.

According to one embodiment, an accumulator tank 40 may be arranged adjacent to the heat pump 2 outlet pipeline 14. In this accumulator tank 40, heated water may be stored before being conveyed to the tap hot water system 34 or the water borne heating system 33. In case the water temperature in the accumulator tank 40 should sink below a certain level, which causes a need for it to be reheated, a return line 41 from the accumulator tank to the heat pump 2 can be provided. In the event that the accumulator tank 40 is connected only to the tap hot water system 34, the accumulator tank may be provided with a heater arrangement so as to act as a water heater.

Generally, heating of the tap hot water system 34 and/or a water borne heating system 33 for heating the building or any other building/buildings with the water coming from the heat pump or the accumulator tank can also be done via heat exchangers.

The heat exchanger element 7, of which there is at least one in the collector tank 4, may further have different designs. According to an embodiment schematically illustrated in FIG. 3, the heat exchanger element 7 may be of a type comprising at least two substantially parallel plates 71, 72 of a self-supporting polymeric material, which are arranged essentially parallel to each other and so that they substantially overlap. A non-freeze liquid inlet 74 is disposed at one end of the heat exchanger element and an outlet 75 for non-freeze liquid is provided at the other end of the heat exchanger element. Between the two plates 71, 72 and the inlet 74 and the outlet 75 is defined an internal flow passage 76 for non-freeze liquid. This internal flow passage 76 extends over substantially the entire surface that the two parallel plates represent and the non-freeze liquid can thus circulate throughout the heat exchanger element in a flow direction from the inlet 74 to the outlet 75. As mentioned, the heat exchanger element may be a heat exchanger as described in the Swedish patent SE 0802068.

The heat exchanger 6 preferably comprises a plurality of interconnected heat exchanger elements 7 connected to the pipeline system 8, which is disposed between the heat pump 2 and the heat exchanger device 6 and in which non-freeze liquid can circulate. These heat exchanger elements are preferably connected in parallel with respect to the flow direction of the non-freeze liquid, such that the non-freeze liquid flows into the heat exchanger elements simultaneously and from a supply pipeline common to the heat exchanger elements. It is thus the supply pipeline that primarily connects the heat exchanger elements. When several heat exchanger elements are interconnected, they can be described as a set of heat exchanger elements. The collector tank 4 may contain several such sets of interconnected heat exchanger elements.

The recovery system may also include at least one temperature sensor 46 for measuring a temperature of the waste water in the collector tank 4. Further, it may include a control system 48 for controlling the heat pump 2 based on measured temperature in the waste water in the collector tank. The heat pump can also be controlled in other ways.

The recovery system may also comprise a preparatory unit 38 where coarser impurities are separated and which is located before waste water is supplied to the supply line 10. The preparatory unit 38 may, for example, contain a mechanical separation unit in the form of a grid to prevent that larger items such as towels or plastic bags clog the inlets of the pumps, and this unit may also include a cleaning device which is mechanically controlled or liquid controlled and which can keep the grid clean. This preparatory unit 38 optionally contains a pump, preferably a cutting pump, which pumps the waste water further on to the collector tank 4 or buffer tank 16.

As is schematically shown in FIGS. 2a-2c, all of the embodiments may include such a preparatory unit 38.

Thus, the recovery system preferably comprises at least one cutting pump, according to the following alternatives:

a cutting pump 24 is located in the buffer tank 16 for waste water, which buffer tank is connected to the collector tank 4 via a collector tank pipeline 26; 126; 226 for conveying waste water from the buffer tank to the collector tank, said pump being configured to pump waste water from the buffer tank 16 to the collector tank 4 via the collector tank pipeline 26; 126; 226, and/or a cutting pump 18 is located in the in the collector tank 4 for pumping waste water to a buffer tank 16 for waste water, via a buffer tank pipeline 20; 120; 220 for conveying waste water from the collector tank to the buffer tank, and/or a cutting pump 39, located in a preparatory unit 38, wherein the cutting pump is configured to pump waste water to the collector tank 4 or to a buffer tank 16.

In FIG. 4, an alternative embodiment of the pipeline system 8 arranged between the heat pump and the heat exchanger device and in which non-freeze liquid can circulate is illustrated. According to this embodiment, pipeline system 8 comprises a heat exchanger unit 80, the pipeline system being divided into two parts in the form of a first part where non-freeze liquid circulates between the heat exchanger unit 80 and the heat exchanger device 6 located in the collector tank 4, and a second part where the non-freeze liquid circulates between the heat exchanger unit 80 and the heat pump 2 and wherein the heat exchanger unit 80 is disposed between the first and the second part of the pipeline system 8. The embodiment of FIG. 4 is thus an alternative to the embodiment of the pipeline system of FIG. 1. Any of the two alternative embodiments of the non-freeze liquid pipeline system 8 can be combined with any of the three collector tank and buffer tank embodiments as shown in FIGS. 2a-2c.

The collector tank and buffer tank are preferably thermally insulated tanks in any form.

A method of recovering thermal energy from waste water from a building includes the following steps:

conveying of waste water into a collector tank 4 in which there is a heat exchanger device 6 that is in contact with said waste water 5, and in which heat exchanger device 6 a non-freeze liquid circulates which can absorb thermal energy from the waste water, which non-freeze liquid also circulates through a heat pump 2 where the non-freeze liquid can emit thermal energy, and where water flowing through the heat pump can absorb thermal energy, and filling of waste water in the collector tank 4 from a buffer tank 16 where waste water can be stored, wherein the conveying of the waste water includes conveying the waste water through at least one cutting pump 18; 24; 39, wherein said at least one cutting pump 24 is located in the buffer tank 16, which buffer tank is connected to the collector tank 4 via a collector tank pipeline 26; 126; 226 for conveying waste water from the buffer tank to the collector tank, said pump being configured to pump waste water from the buffer tank 16 to the collector tank 4 via the collector tank pipeline 26; 126; 226, and/or said at least one cutting pump 18 is located in the in the collector tank 4 for pumping waste water to the buffer tank 16 for waste water, via a buffer tank pipeline 20; 120; 220 for conveying waste water from the collector tank to the buffer tank, and/or said at least one cutting pump 39, located in a preparatory unit 38, from which the cutting pump is configured to pump waste water to the collector tank 4 or to the buffer tank 16.

The waste water can be conveyed directly to the collector tank 4 or via the buffer tank 16. The method may also include that waste water is conveyed to the buffer tank 16 when the collector tank 4 has reached a predetermined level of waste water. For example, waste water can also be conveyed to the buffer tank 16 during emptying of the collector tank 4. Further, the method may include the heat pump 2 being controlled based on the measured temperature in the waste water in the collector tank. The method may also include that the water flowing through the heat pump and to which the thermal energy emitted is used for tap hot water and/or in a building heating system. According to an embodiment, the method may also include the control of the recovery system based on measurement of the temperature and/or flow of waste water in the system and/or non-freeze liquid in the system, and/or water in the system's heat pump and/or the water in an optional accumulator tank connected to the heat pump. Said control can be based on measurement of one or more of said flows and/or measuring the temperature of the waste water in different parts of the recovery system, and/or measuring the temperature of the water flowing through the heat pump and/or the water in an optional accumulator tank connected to the heat pump, and/or measuring the temperature of the non-freeze liquid in different parts of the recovery system.

The invention is not to be construed as limited to the illustrated embodiments, but may be modified and changed in many ways, as will be appreciated by those skilled in the art, within the scope of the appended claims.

The invention claimed is:

1. A recovery system for the recovery of thermal energy from waste water from a building, which recovery system comprises:
   a collector tank to store waste water that freely circulates in the collector tank, wherein a collector tank pump installed on a buffer tank pipeline and a buffer tank pump installed on a collector tank pipeline pumps the waste water between the collector tank and a buffer tank:
   a supply pipeline system for supplying waste water to the collector tank;
   a preparatory unit including a mechanical separation unit protecting a cutting pump, wherein the cutting pump disintegrates coarse particles and pump waste water from the preparatory unit to the collector tank via the supply pipeline system;
   a heat pump;
   a heat exchanger device arranged to be lowered into the collector tank and which is in contact with said waste water; and
   a heat transfer fluid pipeline system arranged between the heat pump and the heat exchanger device, wherein,
   the heat pump is configured to absorb thermal energy from a non-freeze liquid circulating through the heat pump, which the non-freeze liquid can be used as a heat transfer liquid, and the heat pump is configured to transfer thermal energy to water flowing through the heat pump, wherein,
   that non-freeze liquid can circulate in said heat transfer fluid pipeline system, wherein the heat exchanger device is configured such that the non-freeze liquid is conveyed through the heat exchanger device, wherein the non-freeze liquid can absorb thermal energy from waste water the collector tank, and wherein,
   the heat exchanger device comprises one or more sets of heat exchanger elements, in order to be lowered into the wastewater of the collector tank, each heat exchanger element comprising at least two substantially parallel plates of a self-supporting polymeric material, wherein the at least two substantially parallel plates form an internal flow passage therebetween for the non-freeze liquid that extends throughout substantially the entire surface the two parallel plates between a non-freeze liquid inlet disposed at one end of the heat exchanger element and an outlet for non-freeze liquid provided at the other end of the heat exchanger element.

2. The recovery system according to claim 1, wherein each set of the heat exchanger elements comprising a plurality of heat exchanger elements through which the non-freeze liquid circulates.

3. The recovery system according to claim 1, wherein the non-freeze liquid flows in a single flow direction throughout the at least two substantially parallel plates.

\* \* \* \* \*